United States Patent [19]

Arai

[11] 4,411,678
[45] Oct. 25, 1983

[54] METHOD FOR FABRICATING AN OPTICAL WAVEGUIDE ON A PLANAR GLASS SUBSTRATE

[75] Inventor: Motohiro Arai, Tokyo, Japan

[73] Assignee: Nippon Electric Co., Ltd., Tokyo, Japan

[21] Appl. No.: 364,048

[22] Filed: Mar. 31, 1982

[30] Foreign Application Priority Data

Apr. 2, 1981 [JP] Japan ................................ 56-48411

[51] Int. Cl.³ ...................... C03B 19/00; C03C 17/02
[52] U.S. Cl. ..................................... 65/3.12; 427/163
[58] Field of Search ...................... 65/3.12, 18.2, 144; 427/163

[56] References Cited

U.S. PATENT DOCUMENTS 3,957,474 5/1976 Kobayashi et al. ................. 65/3.12
4,090,776 5/1978 Bernal et al. ..................... 350/96.12

FOREIGN PATENT DOCUMENTS 2402270 7/1975 Fed. Rep. of Germany ....... 65/3.12
52-66443 6/1977 Japan ................................. 65/3.12
53-67447 6/1978 Japan ................................. 65/18.2
54-45147 4/1979 Japan ................................. 65/18.2

Primary Examiner—Richard V. Fisher
Attorney, Agent, or Firm—Sughrue, Mion, Zinn, Macpeak & Seas

[57] ABSTRACT

A collimated laser beam focuses on a substrate put in a reaction vessel which includes glass raw materials to raise the temperature high enough for the thermal reaction of the glass raw materials to form a glass layer. The repeated scanning of the glass substrate with the laser beam accumulates a plurality of layers and forms an optical waveguide on the glass substrate.

4 Claims, 3 Drawing Figures

METHOD FOR FABRICATING AN OPTICAL WAVEGUIDE ON A PLANAR GLASS SUBSTRATE

BACKGROUND OF THE INVENTION

The present invention relates to a method for fabricating high-quality optical waveguide on a glass substrate.

Steady improvements have been made in optical fibers, light sources and light detectors with a view toward their practical application in the field of optical communications; and along with their development has been the further development of peripheral devices, such as light branching/coupling devices, optical switches and such other peripheral optical devices. Currently available optical devices, composed of such classic optical elements as lenses, reflectors, prisms and interference plates, are, however, disadvantageous as regards their size, mechanical stability, reliability and in other respects.

Research and development attempts have been made in many quarters, with an eye toward eliminating these disadvantages, as well as to work out optical integrated devices integrating a plurality of optical waveguide type elements on a single substrate.

Attempted methods to form an optical waveguide as a component part of such an optical integrated device, include the following. One method uses the polymerization of monomers in high polymer film (Takato et al., "Characteristics of high polymer light branching circuits, and their applications", *Lecture Transcripts and Papers of the 1979 General National Convention of the Institute of Electronics and Communication Engineers of Japan*, 4 (March 1979), 4-27 (in Japanese)). Another combines semiconductors of different materials ((Maehotoke et al., "Infrared optical waveguide made of non-crystalline semiconductors", *Lecture Transcripts and Papers of the 1977 General National Convention (Commemorating its 60th Anniversary) of the Institute of Electronics and Communication Engineers of Japan*, 4 (March 1977), 4-198 (in Japanese)). Still another method accumulates glass films uniformly on a glass substrate by the chemical vapour deposition (CVD) method and thereafter etches the glass films by the photolithography method (Mori et al., "Embedded type glass waveguide for optical circuit (DS guide)," *Technical Research Report of the Institute of Electronics and Communication Engineers of Japan*, OQE 80-135, (Feb. 20, 1981) pp. 57-64, (in Japanese)).

However, the method using high polymers is disadvantageous in that reliability decreases with age. In addition there are large optical transmission losses. The method utilizing semiconductors is handicapped by the large number of steps required for optical waveguide production and, again, great optical transmission losses are experienced. The process for forming an optical waveguide on a glass substrate by the CVD and photolithography methods is disadvantageous in that it takes many manhours.

Yet another method is disclosed in the U.S. Pat. No. 4,090,776, wherein an optical waveguide is produced by utilizing a laser beam. This method produces a waveguide formed on a glass substrate in the state of residual distortion, and may produce an unstable product.

SUMMARY OF THE INVENTION

Accordingly, an object of the present invention is to provide a method of fabricating an optical waveguide which is free from these disadvantages, susceptible to little optical transmission losses, hardly changes in quality with the lapse of time and yet requires no complex production process.

A method of fabricating an optical waveguide according to the invention, comprises the steps of: setting a glass substrate within a reaction vessel; supplying glass raw materials into the reaction vessel; irradiating a collimated laser beam on the glass substrate to enhance the temperature high enough for the thermal reaction of the glass raw materials to form a glass layer; and repeatedly scanning the glass substrate with the laser beam to accumulate a plurality of layers to thereby form an optical waveguide.

The method according to the invention, which is to form an optical waveguide on a glass substrate through a thermochemical reaction induced by the irradiation of a laser beam, requires only a few fabrication steps, and moreover the optical waveguide thereby provided is susceptible to no change in quality with the lapse of time.

Other advantages and features of the invention will be more apparent from the detailed description set forth hereinafter in conjunction with the accompanying drawings.

DETAILED DESCRIPTION OF THE PREFERRED EMBODIMENTS

Figure 1:
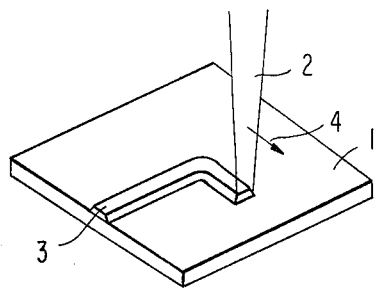
FIG. 1 shows an perspective view illustrating the process of fabrication of an optical waveguide by the irradiation of a laser beam according to the present invention.
Figure 2:
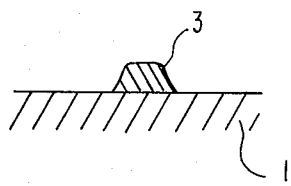
FIG. 2 shows a cross section of an optical guide formed by the process illustrated in FIG. 1, and FIG. 3 briefly outlines a fabrication apparatus for use in the formation of the optical waveguide shown in FIG. 1.

FIG. 1 diagrammatically shows the fabrication method according to the invention. A planar glass substrate 1 (measuring 10 mm × 50 mm, 5 mm thick) made of quartz is arranged in a glass reaction vessel (to be described with reference to FIG. 3), into which is supplied the gases of glass raw materials. The raw material gases are $GeCl_4$, which serves to raise the refractive index of glass, $SiCl_4$, and oxygen, blended at per-minute rates of 100 mg, 0.5 g and 1 liter, respectively. The glass substrate 1' placed in the mixed atmosphere of these glass raw material gases is irradiated by a carbon dioxide gas laser beam 2. The carbon dioxide gas laser beam of 10.6 microns in wavelength is so focused by an optical system as to become 50 microns on the surface of the glass substrate, and heats a point on the glass substrate to a temperature of about 1,500° C., which, lower than the softening point of the glass substrate, is suitable for glass to be precipitated in a transparent state by CVD. Scanning the glass substrate, in for example the direction 4, with a 0.3-W laser beam at a shifting speed of 1 mm/sec can achieve heating to the desired temperature. On the surface region thereby heated, the glass raw materials undergo thermal oxidation to accumulate $SiO_2$ containing $GeO_2$, which is melted by the temperature of the glass surface into transparency 3. Therefore, by scanning the glass substrate with the laser beam, there is formed on the glass substrate an optical waveguide, about 50 microns wide and about 3 microns thick, whose refractive index is approximately 1 percent higher than that of the glass substrate. The cross section of the optical waveguide shown in FIG. 2 is obtained by scanning the glass substrate surface 15 consecutive times with the laser beam, and the optical waveguide in this instance is about 50 microns thick. The optical waveguide thereby formed serves as a multi-mode waveguide, suitable for coupling with a standard optical fiber having a core diameter of 50 microns.

Whereas the foregoing embodiment uses as glass raw materials to form the optical waveguide $SiCl_4$ gas containing $GeCl_4$, which serves to raise the refractive index of glass, it is also acceptable to use $POCl_3$, which serves to further raise the refractive index of glass, with $GeCl_4$ and $SiCl_4$ at per-minute rates of 20 mm, 90 mg and 0.5 g, respectively.

It is important, because a laser beam too short in wavelength would be transmitted by the glass substrate, to use a laser beam of not less than 3 microns in wavelength, which can be effectively absorbed by the glass substrate. Carbon dioxide laser can be generated at a selected wavelength other than 10.6 microns, such as 9.6 microns or 5.3 microns, as required.

While the boundary of the optical waveguide in the foregoing embodiment consists of an air layer, this optical waveguide can be embedded in glass or plastic whose refractive index is lower than that of the waveguide so that the transmission loss due to the adhesion of dust in the air to the optical waveguide wall can be reduced or the optical transmission performance of the waveguide can be improved. To fabricate this embedding structure, $POCl_3$ in place of $GeCl_4$, $SiCl_4$ and oxygen gas are fed into the reaction vessel at per-minute rates of 5 mg, 0.5 g and 1 liter, respectively. Then, the surface of earlier formed optical waveguide and the surrounding region of the substrate are heated to 1,400° C. by scanning them three or four times in the same direction with a carbon dioxide gas laser beam of about 1 W whose diameter is focused to 100 microns, resulting in the formation of a clad layer about 10 microns thick.

The clad layer can as well be formed all over the glass substrate and the optical waveguide by heating the reaction vessel and applying the usual CVD method instead of scanning with a carbon dioxide laser beam.

Further, although the planar glass substrate used in this embodiment is made of quartz, it can obviously be replaced with a glass material having a small thermal expansion coefficient, such as Vycor glass.

Figure 3:
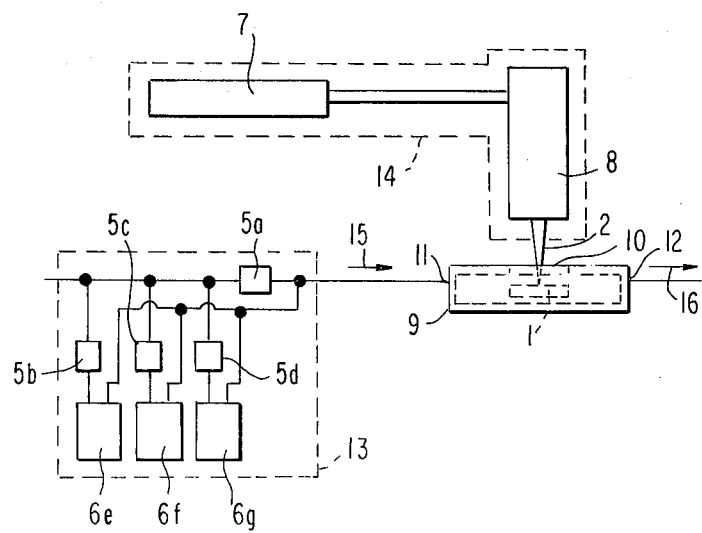

FIG. 3 illustrates an apparatus to implement the present invention by selectively accumulating transparent glass films on a planar glass substrate by CVD. A raw material feeding unit 13, comprising oxygen gas flow control units 5a, 5b, 5c and 5d and glass material containers 6e, 6f and 6g, supplies mixed gas to a reaction vessel 9 through an inlet port 11. In the reaction vessel is arranged a glass substrate 1'. The wall of the reaction vessel facing the surface of the substrate is provided with a window 10 made of a ZnSe sheet, through which a carbon dioxide gas laser beam 2 is irradiated on the substrate. A laser system 14 includes an optical system 8 and a carbon dioxide gas laser generating unit 7 which has a built-in device to control the intensity and intermittence of the beam. The apparatus is so arranged that the laser beam is irradiated on the surface of the glass substrate 1 through an optical system 8 primarily comprising a deflective device for two-dimensional scanning and a focusing lens. Downstream the reaction vessel is provided with an outlet 12, through which is discharged the mixed gas as it becomes unnecessary. An arrow 15 represents the direction in which the mixed gas flows as supplied from the raw material feeding unit 13 to the reaction vessel 9, and another arrow 16, the direction in which the unnecessary mixed gas flows as discharged from the reaction vessel 9.

The optical waveguide fabricated by the hitherto described method of the present invention has many advantages including the reduced susceptibility of its glass films, as compared to those made from high polymers, to deterioration with the lapse of time; its very small optical transmission loss compared with those made of high polymers or semiconductors because the glass films are fabricated by the use of thermal oxidation which is substantially the same as the modified chemical vapour deposition (MCVD) method which is employed for the fabrication of optical fibers; and the smaller number of steps required to fabricate it than in the process of forming an optical waveguide on a glass substrate by the combination of the CVD and photolithography methods.

What is claimed is:
1. A method of fabricating an optical waveguide comprising the steps of:
    installing a planar glass substrate within a reaction vessel;
    supplying glass raw materials into the reaction vessel;
    irradiating a collimated laser beam on a defined region of the planar glass substrate to enhance the temperature high enough for the thermal reaction of the glass raw materials to form on the defined region a transparent glass layer having an index of refraction greater than that of the planar glass substrate, but said temperature being lower than the softening point of the planar glass substrate; and
    repeatedly scanning the glass substrate with the laser beam to accumulate a plurality of transparent glass layers which form an optical waveguide.
2. The method of claim 1, further comprising the step of coating the optical waveguide with glass layers having a lower refractive index than that of the optical waveguide.
3. The method of claim 1 or 2, wherein the laser beam is that of a carbon dioxide laser.
4. The method of claim 1 or 2, wherein the laser beam is focused almost to the same size as the width of the optical waveguide.

* * * * *

UNITED STATES PATENT AND TRADEMARK OFFICE
CERTIFICATE OF CORRECTION

PATENT NO. : 4,411,678

DATED : Oct. 25, 1983

INVENTOR(S) : Motohiro Arai

It is certified that error appears in the above-identified patent and that said Letters Patent is hereby corrected as shown below:

Column 1, line 7, after "cating", insert --a--;

Signed and Sealed this

Twenty-sixth Day of March 1985

[SEAL]

Attest:

DONALD J. QUIGG

Attesting Officer     Acting Commissioner of Patents and Trademarks